INVENTOR.
TAKAJI WASHIO
YOSHITAKE MIYOSHI
BY TATSUO AIZAWA

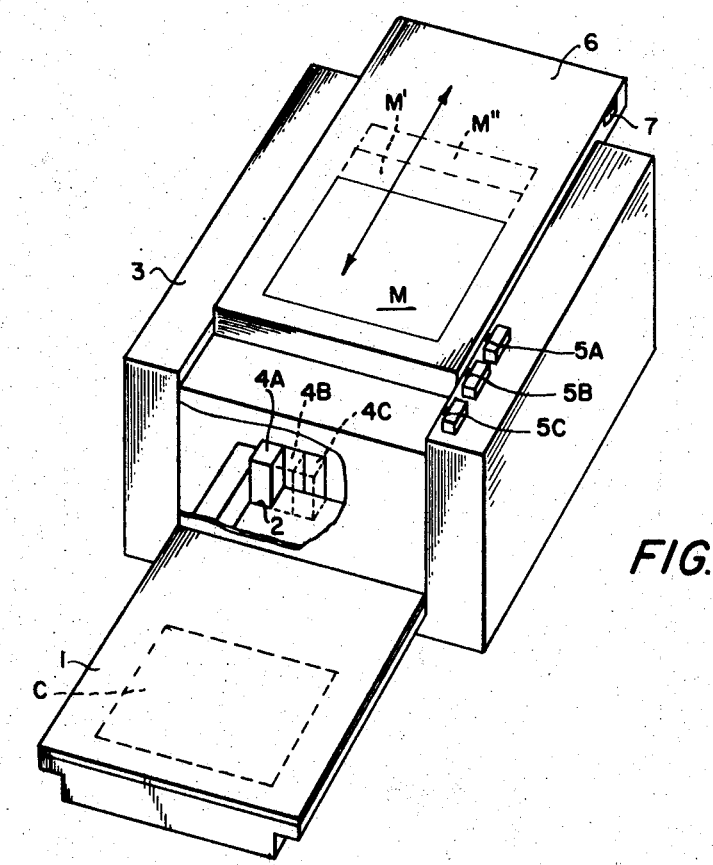
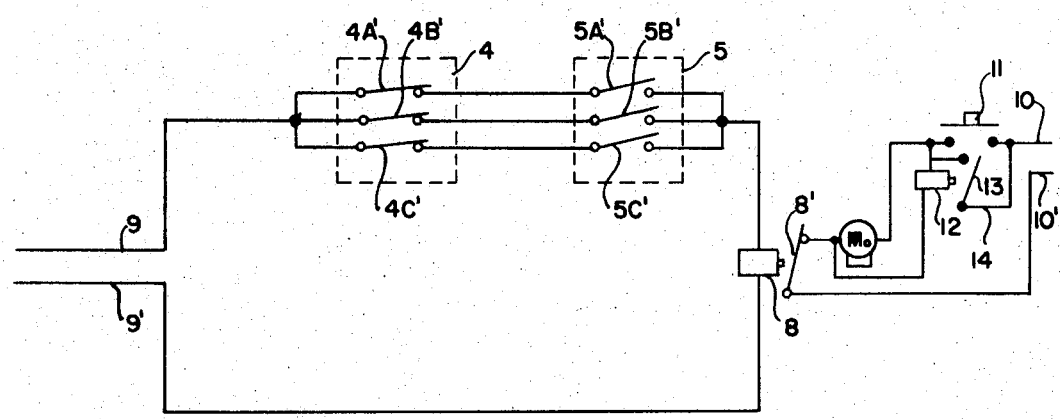
FIG. 4
FIG. 5

United States Patent Office 3,560,087
Patented Feb. 2, 1971

3,560,087
SCANNING LENGTH CONTROL FOR AN
ORIGINAL SUPPORTING SLIDE
Takaji Washio, 616 Minami, Okamachi, Toyonaka, Osaka Prefecture, Japan; Yoshitake Miyoshi, 1985–1 Tawaraguchi, Ikoma-cho, Ikoma-gun, Nara Prefecture, Japan; and Tatsuo Aizawa, 6–34 Kuwazu-cho, Higashisumiyoshi-ku, Osaka, Japan
Filed Sept. 18, 1968, Ser. No. 760,535
Claims priority, application Japan, Sept. 20, 1967, 42/60,319
Int. Cl. G03b 27/32
U.S. Cl. 355—14                                      7 Claims

ABSTRACT OF THE DISCLOSURE

Equipment for limiting the travel of a master carrying slide during the exposure of a charged electrophotographic copy sheet so the travel of the master will be limited to the length of the copy and the slide will immediately return to its starting position so that a maximum number of copies can be made from a given size master and no time is wasted in idle travel of the master. The extent of travel is controlled by the cartridge carrying the copy sheets, with the cartridge having shaped slots corresponding to the size of the copy sheets therein to control the slide travel by engaging switches on the machine which are in series with corresponding switches operated by the slide.

---

The present invention relates to copy making and particularly to electrophotographic copy making where a number of copies are made from a single size master.

Heretofore, in conventional copy making machines, a master of substantial length or a master of short length required the same time of exposure to make a copy, while the useful material on the master might occupy only a short length of the longest master. However, the copy making machines were designed for the largest master and the largest copy and consequently when short copies were being made, there was a loss of productive time when the exposure continued beyond the end of the master and beyond the end of the copy sheet.

An object of the present invention is to provide timing means for copy making machines which eliminates this waste of useless travel of the master carrying slide.

Another object is to provide automatic means to control the travel of the master carrying slide in accordance with the copy sheet material used.

Briefly, the invention is used on an electrophotographic copy machine in which the master is carried by a slide and each copy sheet is electrostatically charged and exposed from the master through a suitable optical system including the necessary illumination for making the latent image on the charged copy sheet and then developing the latent image by one of the usual means. Cartridges are provided for different sizes of copy sheets and the housing of the copy making machine is adapted to receive the cartridges and the cartridges are provided with shaped means which engage switch operating members which in turn operate switches which set the copy making machine for the selected length of copy sheet. When the copy machine is started and the slide carrying the master moves the correct distance for the copy being made, a shaped means engages one of a plurality of other switches which cooperate with the motor for moving the slide in its travel to stop the slide and cause the slide to return to its initial position for the next copy to be made. Suitable provision is made for repeating the operation to make any number of copies without any waste of time of needless travel of the master carrying slide.

Figure 1:
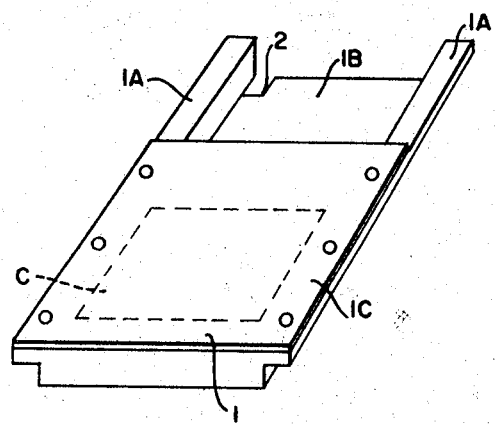
Figure 2:
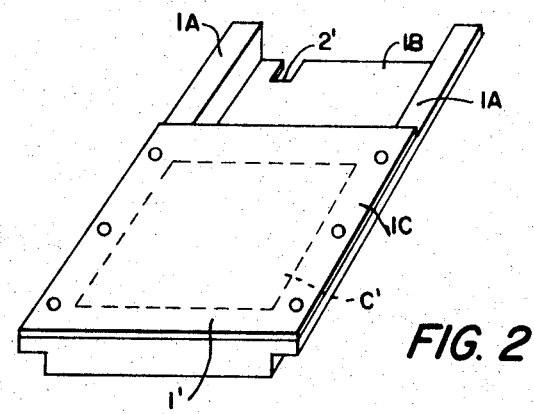
Figure 3:
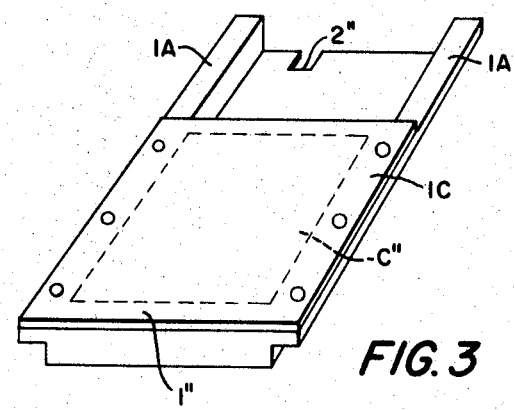

Other and further objects will be apparent as the description proceeds and upon reference to the accompanying drawings wherein:

FIGS. 1, 2, and 3 show three different cartridges having shaped portions in the form of slots at different locations on one end thereof and have short, middle-size and long copy sheets in the respective cartridges;

FIG. 4 is a perspective of a copy making machine with the master carrying slide movable along the top thereof and the cartridge carrying the small size copy sheets positioned in operative relation so the conditioning switch for short copies is closed, the other conditioning switches being held open and the stop switches being maintained in their normal open position adapted to be closed by the shaped means on the slide; and FIG. 5 is an electrical wiring diagram showing how the control for the timing is accomplished.

FIG. 1 shows a cartridge 1 having side rails 1A, 1A, a bottom plate 1B and a top plate 1C with one end closed and small size copy sheets C therein and a slot 2 closely adjacent one rail for reception of a switch operating member.

FIG. 2 shows a cartridge for middle-size copies C' and has a slot 2' in the bottom thereof for cooperation with a different switch operating member; while FIG. 3 shows a cartridge for long copy sheets C" and has a slot 2" for reception of a still different switch operating member. Any one of the cartridges is adapted for reception in the copy making machine of FIG. 4 which shows a housing 3 having a dove-tail slot for reception of the slotted ends of the cartridges and the slotted end of cartridge 1 is shown positioned so operating member 4A is received in such slot while operating members 4B and 4C are pushed in and such operating members cooperate with corresponding normally closed switches 4A', 4B' and 4C' resulting in switch 4A' remaining closed while switches 4B' and 4C' are open.

The slide 6 carrying the master M corresponding to a small-size copy moves from its starting position shown forwardly so that the shaped cam means 7 on the slide may successively engage the operating members 5A, 5B, 5C, for the normally open switches 5A', 5B', and 5C'. The slide 6 is moved in the exposing direction which is forwardly by means of a suitable motor M supplied with power from lines 10, 10' and when copies are to be made, the operator inserts the proper cartridge in the housing and then causes a normally open switch 11 to be closed, thereby momentarily completing a circuit from line 10 through the motor M, through the relay armature 8' to the other line 10' and at the same time energizes relay 12 causing the armature 13 thereof to close, thereby bridging the normally open contact of switch 11 with a lead 14. The slide then moves at the predetermined rate until the shaped cam 7 engages the selected switch 5A at which time a circuit is completed from line 9 through switch 4A' and switch 5A' through the coil of relay 8 and to the other line 9' which momentarily causes the armature 8' of relay 8 to break the circuit to motor M which also de-energizes the coil of relay 12 permitting armature 13 to open the circuit from line 10, thereby stopping the motor M. The slide 6 is then moved rapidly to its starting position by any suitable means such as a spring return or a weight moved by gravity or any other suitable means and the next copy is made by repeating the process with the normally open switch 11 closed by automatic means or by the operator.

It will be apparent that other suitable means for moving the table may be provided and the motor may be of the type having a clutch which is energized simultaneously with the motor so the clutch is released and the slide can be moved back by gravity means or any other suitable means or by another motor which might be energized by other contacts of relay 8 when the relay is energized, for example.

From the above description it will be apparent that the invention provides for making copies rapidly in accordance with the size of the master whether the master is a small one as shown in full lines or a middle-size one M' shown in dotted lines as an extension of master M, or a long master as shown in dot-dash lines M' and similarly the copy sheets C, C' and C" would be made of a corresponding length and packaged in the cartridges 1, 1' and 1", respectively, and the person using the equipment need only determine the length of the master and select the proper cartridge and insert such cartridge in the housing 3 so that the appropriate conditioning switch 4A', 4B' or 4C' would be closed and then when the slide 6 is moved by any suitable drive such as that shown, the drive is automatically stopped when the corresponding switch 5A', 5B' or 5C' is closed, thereby completing the circuit through the conditioning switch, through the relay coil 8 to open the contact of armature 8' and thereby stop the motor and stop the slide and permit the slide to be returned to its starting position.

It will be apparent that changes may be made within the spirit of the invention as defined by the valid scope of the claims.

What is claimed is:

1. Timing means for copy making machine in which the master is carried on a traveling slide which is driven by a motor and copy sheets are carried in cartridges adapted to be inserted in the copy making machine comprising a housing, a first set of switches having first operating members on said housing, copy sheet cartridges having first shaped portions for engaging said first switch operating members and leaving one of said first set of switches closed, means on said housing for receiving copy sheet carrying cartridges so the shaped portions thereof cooperate with selected switch operating members of said first set of switches, a second set of switches having second switch operating members on said housing, second shaped means movable with said slide to engage second switch operating members, electrical connections between corresponding ones of said first and second sets of switches and the motor drive for causing operation of said motor drive and travel of said slide for a limited distance, said second switch operating members engageable with the second shaped means movable with said slide and stopping the travel of said slide by stopping the motor drive in accordance with the selected cartridge for the length of the selected size of the copy sheets in the selected cartridge.

2. The invention according to claim 1 in which the housing is closed and has an opening for receiving the end of the cartridge having the shaped portions so copy sheets in the cartridge are maintained in unexposed condition.

3. The invention according to claim 1 in which the first switches are normally closed and the second switches are normally open and the shaped portion of the cartridges holds all of said first switches open except one and the second shaped means on said slide closes one of said second switches.

4. The invention according to claim 3 in which a relay is in circuit with said first and second switches and such relay upon energization stops the motor drive and stops the slide.

5. The invention according to claim 4 in which power is supplied to the motor through a normally open switch and a circuit holding relay bridging said normally open switch.

6. The invention according to claim 1 in which the shaped means on each cartridge is a slot for receiving one of the operating members for said first switches and copy sheets are provided in each cartridge in accordance with the location of the slot to correspond with the length of the master for location on the slide.

7. The invention according to claim 3 in which the shaped means on said slide is on one edge thereof and the operating members for the second switches lie in the path of said second shaped means.

References Cited

UNITED STATES PATENTS 3,009,402 11/1961 Crumrine et al. _____ 95—12.5X
3,421,816 1/1969 Robertson et al. _____ 355—14X JOHN M. HORAN, Primary Examiner K. C. HUTCHINSON, Assistant Examiner U.S. Cl. X.R.

355—72, 74